Figure 1:
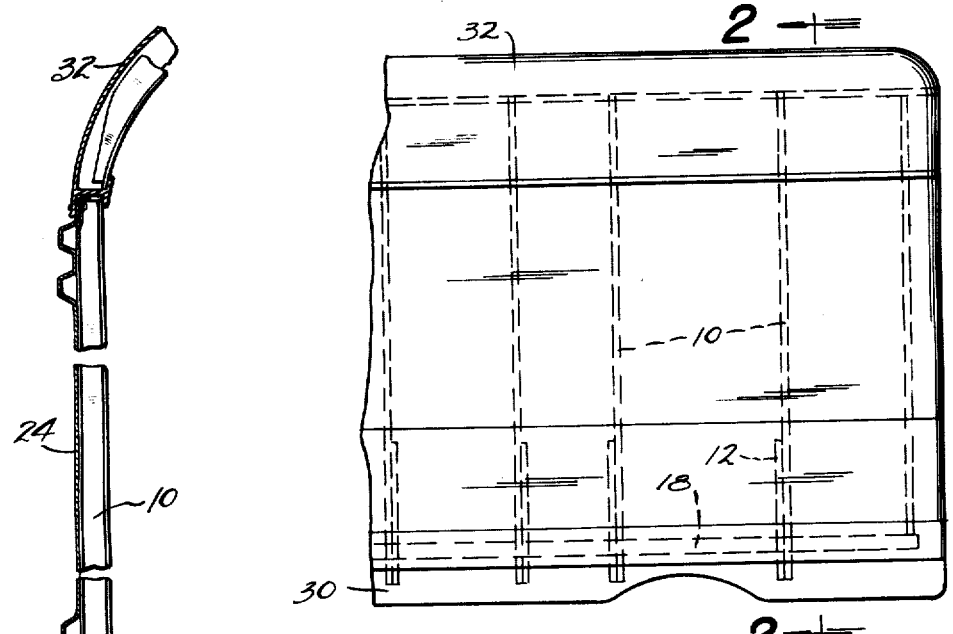

July 4, 1950

J. W. GREIG 2,513,473

VEHICLE BODY SIDE WALL

Filed March 3, 1947

2 Sheets-Sheet 1

INVENTOR.
JAMES W. GREIG.
BY
Parker and Burton.
ATTORNEYS.

July 4, 1950 J. W. GREIG 2,513,473
VEHICLE BODY SIDE WALL
Filed March 3, 1947 2 Sheets-Sheet 2

INVENTOR.
JAMES W. GREIG.
BY
Parker and Burton
ATTORNEYS.

Patented July 4, 1950

2,513,473

UNITED STATES PATENT OFFICE 2,513,473

VEHICLE BODY SIDE WALL

James W. Greig, Detroit, Mich., assignor to Woodall Industries, Inc., Detroit, Mich., a corporation of Michigan Application March 3, 1947, Serial No. 732,103

2 Claims. (Cl. 296—28)

This invention relates to an improved side wall for a vehicle body.

An object is to provide an improved side wall structure for a vehicle body which side wall includes improved upright pillars and improved sheet metal panels assembled together upon the pillars in an improved arrangement which produces a side wall of strong and rugged construction and neat and attractive design.

Another object is to provide an improved side wall for a vehicle body wherein improved metal panels are so formed and so assembled together upon improved supporting pillars that the side wall is uniformly strong and rugged throughout and substantially free from local areas of weakness.

The lower portion of the wall throughout its length exhibits a strong and sturdy construction and resistance to blows or wearing friction and both the lower and upper portions of the wall are so reinforced and strengthened as to provide a wall structure of great strength and durability throughout.

A further object is to provide such a side wall wherein the panels are so formed and assembled that side walls of different heights may be produced merely by providing intermediate or central panel sections of different widths.

Another object is to provide such a side wall wherein a plurality of panel sections of limited width extend fore and aft of the vehicle and which sections are so formed and so attached to the supporting pillars that certain portions of the wall which are most likely to be damaged during use of the vehicle may be readily separately removed and replaced without alteration of the remainder of the side wall.

Another object is to provide a side wall structure which includes a lower panel of limited height extending fore and aft of the wall at approximately the floor line and which panel is of strong and rugged construction, an upper panel which extends along the top of the wall at approximately the roof line and which is of strong and rugged construction, and an intermediate panel disposed between the lower panel and upper panel and which is a panel of individually less strength and ruggedness and represents a plane expanse of panel. The intermediate panel may be provided in different widths to provide side walls of different height. The entire panel assembly of the complete side wall structure possesses great strength and ruggedness.

Another object is to provide a side wall structure with improved upright pillars which taper from bottom to top and under load strains or road travel strains or wind stresses flex throughout their height so that the stresses are distributed throughout the length of the pillars instead of imposing a heavy localized strain at one particular point such as the joint between the pillar and the floor of the vehicle body. The improved pillar preferably includes a stub pillar and floor bracket portion secured to the bottom of the main pillar and serving to fasten the floor thereto and also to strengthen the entire pillar structure to serve its required ends.

Figure 2:
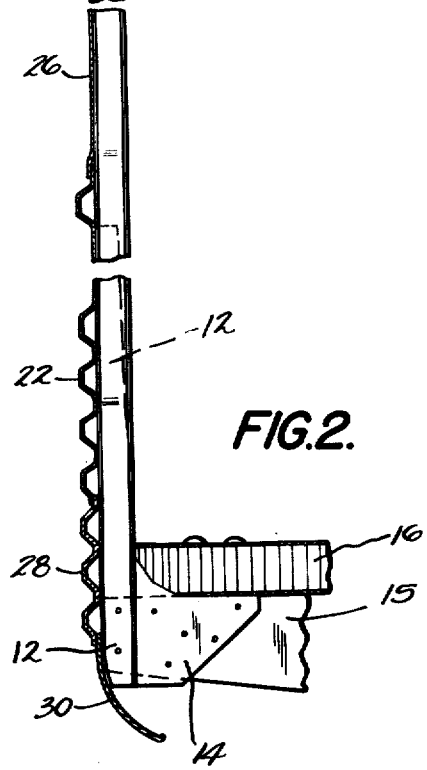
Figure 3:
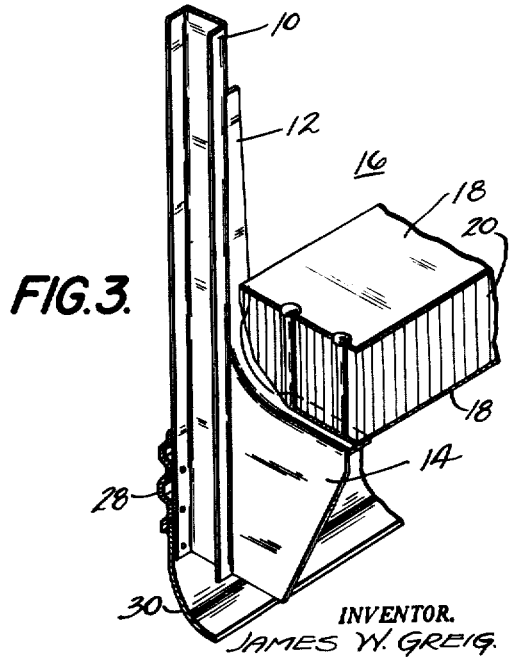
Figure 4:
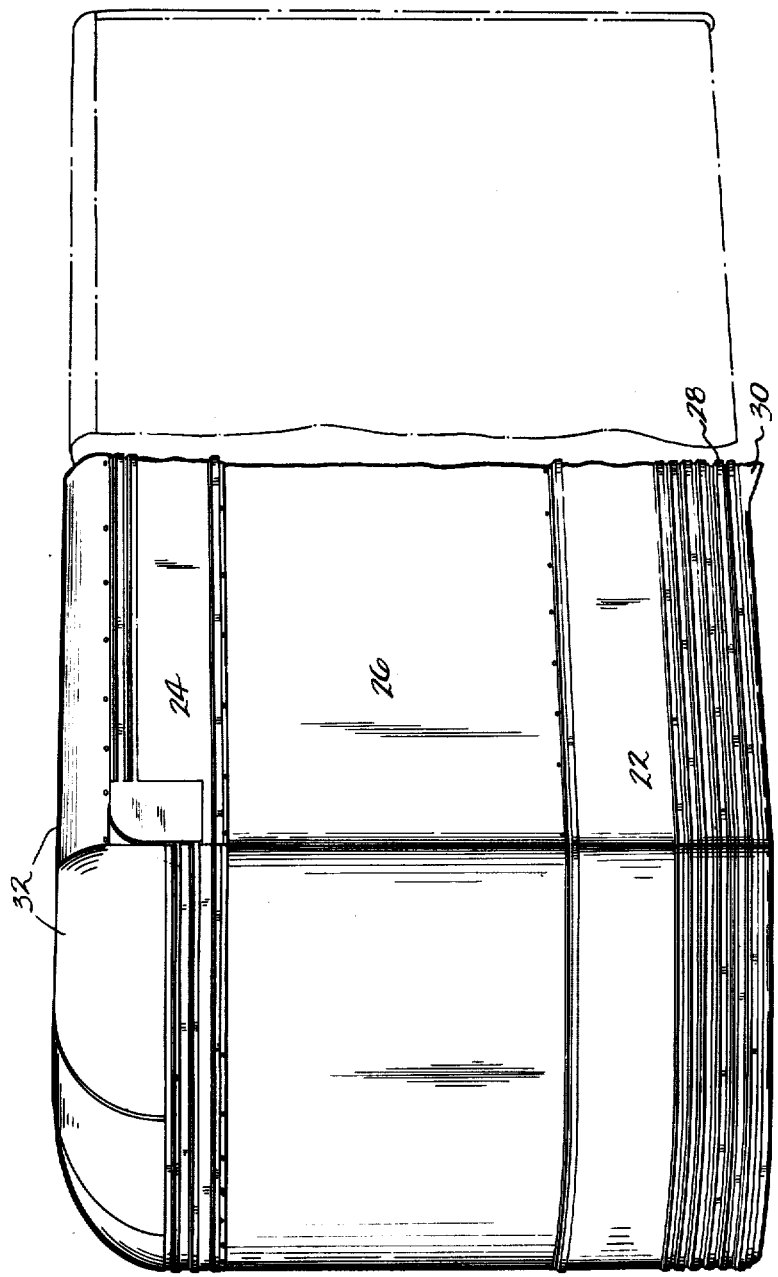

Other objects, advantages and meritorious features will more fully appear from the following description, appended claims and accompanying drawings wherein:

Fig. 1 is a diagrammatic elevation of a fragment of a side wall embodying my invention, Fig. 2 is a vertical sectional view taken on the line 2—2 of Fig. 1, Fig. 3 is a perspective of a fragment of a side wall upright pillar provided with an improved floor supporting portion, Fig. 4 is a perspective of a vehicle body exhibiting a side wall embodying my invention.

A vehicle body side wall disclosing my invention is shown as a side wall of a trailer illustrated in broken away perspective (Fig. 4). The side wall consists of a plurality of spaced apart upright pillars 10 (Figs. 1, 2 and 3) and a plurality of sheet metal panel sections secured thereto and supported thereby.

The upright pillars 10 are of improved construction. Each pillar tapers from bottom to top. An eight foot pillar of channel cross section might exhibit a width of two inches at the bottom and one and one-half inches at the top. Such a pillar is shown in Fig. 2. Each pillar is shown as provided at its lower end with a stub pillar 12 which is so shaped as to exhibit an inwardly projecting floor bracket portion 14 shaped as shown in Figs. 2 and 3. This stub pillar 12 also tapers as shown in dotted outline in Fig. 2 and is welded or otherwise secured to the main pillar 10. The main pillar 10 and the stub pillar 12 are channel-shaped in cross section and are secured together back to back as shown. Due to the tapering of the pillar assemblies, each main pillar and each stub pillar, any loads imposed thereupon which would tend to place a heavy strain upon the joints between the pillars and the floor with possible damage or breakage at such points will be distributed throughout the height of the several pillars rather than localized at such joints and the strength and durability of the structure is thereby substantially increased.

For example, a load on the floor of the body which would depress the center of the floor would tend to swing the bottoms of the pillars connected with the floor inwardly. Under road travel a load carried by the body may shift therein thereby imposing a strain on the side walls. The trailer body will sway during road travel particularly in going about a curve and this imposes strains on the side walls. In travel over the road of a vehicle body the continuous and innumerable jolts of road travel subject the joints between the pillars and the floor to a constant succession of strains and stresses which produce fatigue of the metal. Any of these forces imposes a strain on the pillars tending to swing them about their joints with the floor and results in fatigue and weakening at such point.

Any of the above described strains or stresses and many others applying leverage through the pillars to the joints of the pillars with the floor which leverage acts in both directions depending upon the direction of the force and may result in so weakening the pillar or side wall and its joint with the floor that breakage results. Breakage of the conventional rigid uniform dimension pillars at their joints with the floor under road travel of the vehicle is not uncommon in trailer bodies.

A floor assembly 16 is secured to and supported by the bracket portions 14 of the stub pillars 12 as illustrated in Figs. 2 and 3. In Fig. 2 the floor assembly includes a transverse beam 15 while in Fig. 3 such beam is omitted, all as hereinafter described. The floor assembly here disclosed is that shown and claimed in my co-pending application Serial No. 729,017, filed February 17, 1947, now Patent No. 2,485,047, granted October 18, 1949. It comprises a three-ply panel structure consisting of two outer plies 18 of sheet metal secured to opposite faces of a core ply 20 of wood or the like. The grain of the wood of the core ply is disposed perpendicularly with respect to the metal plies. The metal plies are adhesively secured to opposite faces of the wood ply.

While this particular floor structure is here illustrated, it is understood that within the purview of this invention, any suitable type of floor structure may be employed with the side wall and that the side wall forms the subject matter of this particular application. In Fig. 3 I have shown the floor assembly as supported upon the bracket 14 alone while in Fig. 2 I have shown a transverse cross beam 15 as secured at one end to the bracket 14. Such beam 15 would extend transversely of the vehicle underneath the floor and any type of floor might be supported upon said transverse beams which extend between and are secured to the side wall pillars 12.

In load carrying vehicle bodies it is desirable to achieve maximum strength with minimum weight. It is also desirable to provide strong, rugged and durable side walls. The side walls of trailers or truck bodies should be particularly strong because of the damaging impact and abrading contact to which they are subjected in service.

The instant side wall structure consists of a plurality of sheet metal side wall panels secured to the pillar members hereinbefore described. These side wall panels and the pillar members constitute the entire side wall assembly. There is a lower panel 22, an upper panel 24, an intermediate or central panel 26, a rub rail panel 28, and a skirt panel 30. These several panels extend lengthwise of the vehicle body side wall. They are secured to the pillars in a suitable manner as by riveting or the like. The linear stresses and load are taken by these panels being transmitted thereto from the pillars and from the floor.

The lower panel 22 is strengthened and stiffened along its lower margin by a plurality of flutes extending therealong, being provided with four parallel flutes along such lower margin. It is strengthened along its upper margin by a single flute shown as extending therealong. The upper panel 24 is similarly strengthened and stiffened by a plurality of flutes extending along its upper margin, being provided with two flutes along such margin and with a single flute extending along its lower margin. These upper and lower panels therefore provide the necessary stiffening and strengthening of the side wall along its top and bottom margins. Disposed between these upper and lower panels is a plane intermediate or a central panel 26. A side wall fabricated according to the present disclosure may be built to any desired height merely by providing a central panel of the desired width.

To further stiffen and strengthen the side wall directly along the margin of the floor, there is provided a rub rail of a rugged durable character which is a fluted or corrugated strip panel 28 of substantial thickness as compared with the thickness of the panels heretofore discussed. Disposed below this rub rail panel is a skirt panel 30 which is also a panel of substantial thickness. The rub rail panel and the lower panel 22 provide the necessary strength along the lower margin of the side wall and the entire side wall exhibits a strong and rugged construction.

It has been found that the side walls of a truck or trailer are frequently damaged in a single accident along a fore and aft line but within a limited height range. The side wall may be gouged or damaged along a line fore and aft of the vehicle which line of damage does not vary greatly in height from one end to the other. The rub rail is disposed at a height of probable impact and is designed to take such impact. Due, however, to the side wall being fabricated from a plurality of linearly extending panels of limited width and due to the likelihood of an injury to a side wall in any one accident being localized as to height but spread out fore and aft, it is generally possible upon injury to remedy the same by removal and replacement of a single panel without tearing down the remainder of the side wall structure. Any linearly extending panel may be readily removed and replaced.

A vehicle body would be normally provided with a roof and a roof structure is indicated at 32. This roof is shown as having a marginal part so shaped as to receive the upper ends of the side wall pillars 10 and to overlap the upper margin of the upper panel 24 as shown in Fig. 2. Except as a combination with the side wall the roof forms no part of this instant invention, namely, the roof per se forms no part of the invention.

What I claim is:

1. In a side wall for a vehicle body an upright pillar consisting of a main pillar portion channel-shaped in cross section, a stub pillar portion channel-shaped in cross section, said pillar portions being secured together back to back, said stub pillar portion having a part projecting inwardly of the main pillar and exhibiting a floor supporting flange which forms a continuation of a side wall of the channel shape of the pillar.

2. The invention as defined in claim numbered 1 characterized in that the main pillar is tapered from bottom to top, the stub pillar is tapered from bottom to top, and the floor supporting flange of the stub pillar part is a continuation of the inner side wall of the channel shape of the pillar.

JAMES W. GREIG.

REFERENCES CITED

The following references are of record in the file of this patent:

UNITED STATES PATENTS

| Number | Name | Date |
|---|---|---|
| 1,643,742 | Ledwinka | Sept. 27, 1927 |
| 1,673,786 | Warhus | June 12, 1928 |
| 2,029,756 | Davis, Jr. | Feb. 4, 1936 |
| 2,172,571 | Theriault | Sept. 12, 1939 |
| 2,239,089 | Fageol | Apr. 22, 1941 |

FOREIGN PATENTS

| Number | Country | Date |
|---|---|---|
| 119,557 | Austria | Oct. 25, 1930 |
| 406,820 | France | Dec. 16, 1909 |

OTHER REFERENCES

Pl. 804 Fourgon-Bernard D. H. 6, "L'Auto Carrosserie" of March-April, 1937.